United States Patent
Whitten

(10) Patent No.: US 7,467,717 B2
(45) Date of Patent: Dec. 23, 2008

(54) FAILED ROLL CONDOM REMOVAL APPARATUS

(76) Inventor: James R. Whitten, 5104 Grandview Dr., Albany, GA (US) 31721

( * ) Notice: Subject to any disclaimer, the term of this patent is extended or adjusted under 35 U.S.C. 154(b) by 36 days.

(21) Appl. No.: 11/528,145

(22) Filed: Sep. 27, 2006

(65) Prior Publication Data

US 2007/0176606 A1    Aug. 2, 2007

Related U.S. Application Data

(60) Provisional application No. 60/753,545, filed on Dec. 23, 2005.

(51) Int. Cl.
   *B07C 5/00* (2006.01)
(52) U.S. Cl. .................... 209/552; 209/572; 324/557; 324/558; 198/457.07; 198/624
(58) Field of Classification Search ............. 209/552, 209/572; 324/557, 558; 198/457.07, 624
   See application file for complete search history.

(56) References Cited

U.S. PATENT DOCUMENTS

| | | | | |
|---|---|---|---|---|
| 2,221,323 | A | * | 11/1940 | Gammeter ............... 209/571 |
| 2,371,818 | A | * | 3/1945 | Gammeter ............... 425/438 |
| 2,503,803 | A | * | 4/1950 | Cremer et al. ........... 209/572 |
| 2,649,960 | A | * | 8/1953 | Gammeter ............... 209/572 |
| 5,478,193 | A | | 12/1995 | Vonier et al. |
| 5,499,898 | A | | 3/1996 | Vonier et al. |
| 5,517,849 | A | * | 5/1996 | Sisbarro et al. ............. 73/40 |
| 5,564,552 | A | | 10/1996 | Vonier et al. |
| 5,685,409 | A | * | 11/1997 | Bruss et al. .......... 198/457.07 |
| 5,971,690 | A | | 10/1999 | Whitten |
| 6,160,406 | A | | 12/2000 | Underwood et al. |
| 6,318,154 | B1 | * | 11/2001 | Povlacs et al. .............. 73/40 |
| 6,394,258 | B1 | | 5/2002 | Whitten |
| 6,588,989 | B2 | | 7/2003 | Whitten et al. |
| 6,611,149 | B1 | | 8/2003 | Underwood et al. |
| 6,984,992 | B1 | * | 1/2006 | Whitten ................... 324/558 |

* cited by examiner

*Primary Examiner*—Patrick H Mackey
*Assistant Examiner*—Kalyanavenkateshware Kumar
(74) *Attorney, Agent, or Firm*—Thomas C. Saitta

(57) ABSTRACT

An automatic failed roll condom detection and removal apparatus wherein failed roll condoms are rapidly removed from a testing mandrel such that shut down of the testing and handling equipment is not required. Detection means detect the presence of a failed roll condom on a testing mandrel as it returns from the testing and removal station and ejection means remove the failed roll condom from the mandrel. The ejection means has a series of rotating brushes having relatively stiff bristles, the brushes being mounted on a reciprocating carriage in ascending manner in the mandrel return travel direction. When a failed roll condom is detected, the shuttle carriage return rate is slowed and the rotating brushes are brought into contact with the failed roll mandrel, each brush in succession pushing or rolling the condom higher on the mandrel until the final brush ejects the condom. After the failed roll condom is removed, the brush carriage retracts and the shuttle carriage is brought back up to normal operating speed.

18 Claims, 4 Drawing Sheets

FAILED ROLL CONDOM REMOVAL APPARATUS

This application claims the benefit of U.S. Provisional Patent Application Ser. No. 60/753,545, filed Dec. 23, 2005, the disclosure of which is incorporated herein by reference.

BACKGROUND OF THE INVENTION

This invention relates generally to the field of condom testing apparatuses, and in particular to such testing apparatuses where condoms to be tested for defects are mounted onto testing mandrels, and more particularly to the field of apparatuses for removal of the condoms from the mandrels after testing, and even more particularly to the field of apparatuses for removal of a condom that has failed to be removed from a testing manual during a prior removal operation.

The manufacture, handling and testing of condoms or similar articles of manufacture presents unique challenges to industry, due to the non-structured, lightweight and fragile nature of the goods. In addition, in view of their intended use, it is necessary to individually test each and every condom prior to its packaging and distribution for use. Examples of condom handling, transport and testing equipment can be seen in U.S. Pat. Nos. 5,478,193, 5,499,898, 5,564,552, 5,971,690, 6,160,406, 6,394,258, 6,588,989 and 6,611,149, the disclosures of which are incorporated herein by reference. One common testing method in the industry is to mount, i.e., stretch, each condom onto an electrically conductive mandrel of a shape generally corresponding to the condom shape. A gapped electrical circuit is created between the mandrel and one or more electrically conductive receptors, such as a mesh, brush, pad or the like, wherein the gap is sufficiently small such that electrical current will jump or arc across the gap when the circuit is active. If the condom is not defective, i.e., if there are no holes or excessively thin spots in the condom, the condom acts as an insulator and prevents arcing between the mandrel and the electrical receptors, such that the circuit remains open, in which case the condom is removed from the mandrel and further processed. A completed circuit caused by electrical arcing between the mandrel and the electrical receptors through a defect in the condom, however, indicates that the condom is faulty and the condom is removed from the mandrel and discarded.

The testing apparatuses are automatic and operate at very high rates so that large numbers of condoms are tested per minute. The testing mandrels are brought by or to the testing equipment in a continuous manner or in batches, such as by the use of shuttle carriages that move a set number of mandrels from a loading station, where the condoms are loaded onto each mandrel, brought to the testing and condom removal station, and then transported back to the loading station. The equipment is designed such that both defective and non-defective condoms are removed from the mandrels prior to the shuttle carriage returning to the loading station, but it often happens that a condom is not removed from one of the mandrels. This is referred to in the industry as a failed roll, since the condom removal method involves rolling the condom ring up mandrel until the condom springs from the tip of the mandrel or is otherwise removed by vacuum, mechanical gripping or like means. A failed roll condom may be a condom that inadvertently remains on the mandrel in a rolled condition, a condom that fails to roll sufficiently, a condom that is torn, a double-loaded condom, a condom with a defective or missing ring, etc.

When a failed roll occurs, the standard practice has the testing apparatus detecting the failed roll and automatically shutting itself off to allow for manual removal of the failed roll condom from the mandrel by attendant workers. In practice, a failed roll is likely to occur every 5 to 20 minutes on average, and the lost productivity while the machine is shut down for removal of a single failed roll condom and then restarted may total 100 to 150 condom tests. The accumulated lost time over a 24 hour production cycle is greatly detrimental.

It is therefore an object of this invention to provide an automatic failed roll condom detection and removal apparatus and system such that removal of failed roll condoms occurs automatically without requiring shut down of the testing equipment. It is an object to provide such an apparatus where multiple rotating brushes are used to remove the failed roll condom from the mandrel in order to insure that removal of the failed condom is accomplished in every case. It is an object to provide such an apparatus where the removal of the failed roll condom occurs during transport or movement of the mandrel bearing the failed roll condom.

SUMMARY OF THE INVENTION

The invention comprises an automatic failed roll condom detection and removal apparatus wherein failed roll condoms are rapidly removed from a testing mandrel during a transport operation such that shut down of the testing and handling equipment is not required. Failed roll condoms are defined as condoms that should have been removed from a mandrel after a testing or similar operation has been performed but instead remain on the mandrel. The failed roll condoms may be defective or non-defective, torn, double-loaded, missing a condom ring, etc. In the invention, failed roll detection means detect the presence of a failed roll condom on a testing mandrel as it returns from the testing and removal station and failed roll ejection means remove the failed roll condom from the mandrel without need for stopping transport of the testing mandrel.

The detection means preferably comprises a system incorporating a photodetector or like means for easily determining that a failed roll condom remains on a mandrel, the system initiating action by the ejection means when a failed roll condom is detected. The ejection means preferably comprises a series of rotating brushes having relatively stiff bristles, the brushes being mounted on a reciprocating carriage in ascending manner in the mandrel travel direction, which for a reciprocating shuttle carriage mandrel apparatus will be the direction of return from the testing and removal station to the loading station. When a failed roll condom is detected, the shuttle carriage return rate is slowed and the rotating brushes are brought into contact with the failed roll condom and mandrel. Because the condom is not to be used it is not necessary to handle the condom delicately, and the use of stiff bristles insures that the condom is ejected from the mandrel, each brush in succession pushing or rolling the condom higher on the mandrel until the final brush ejects the condom completely. After the failed roll condom is removed, the brush carriage retracts and the shuttle carriage is brought back up to normal operating speed.

DETAILED DESCRIPTION OF THE INVENTION

With reference to the drawings, the invention will now be described in detail with regard for the best mode and the preferred embodiment. In general, the invention is a failed roll condom removal apparatus that detest and removes a failed roll condom from a testing mandrel. A failed roll condom event occurs when the standard condom removal means, which typically rolls a condom up and off a mandrel, fails to remove a condom from the mandrel after the condom has been tested for defects.

Figure 1:
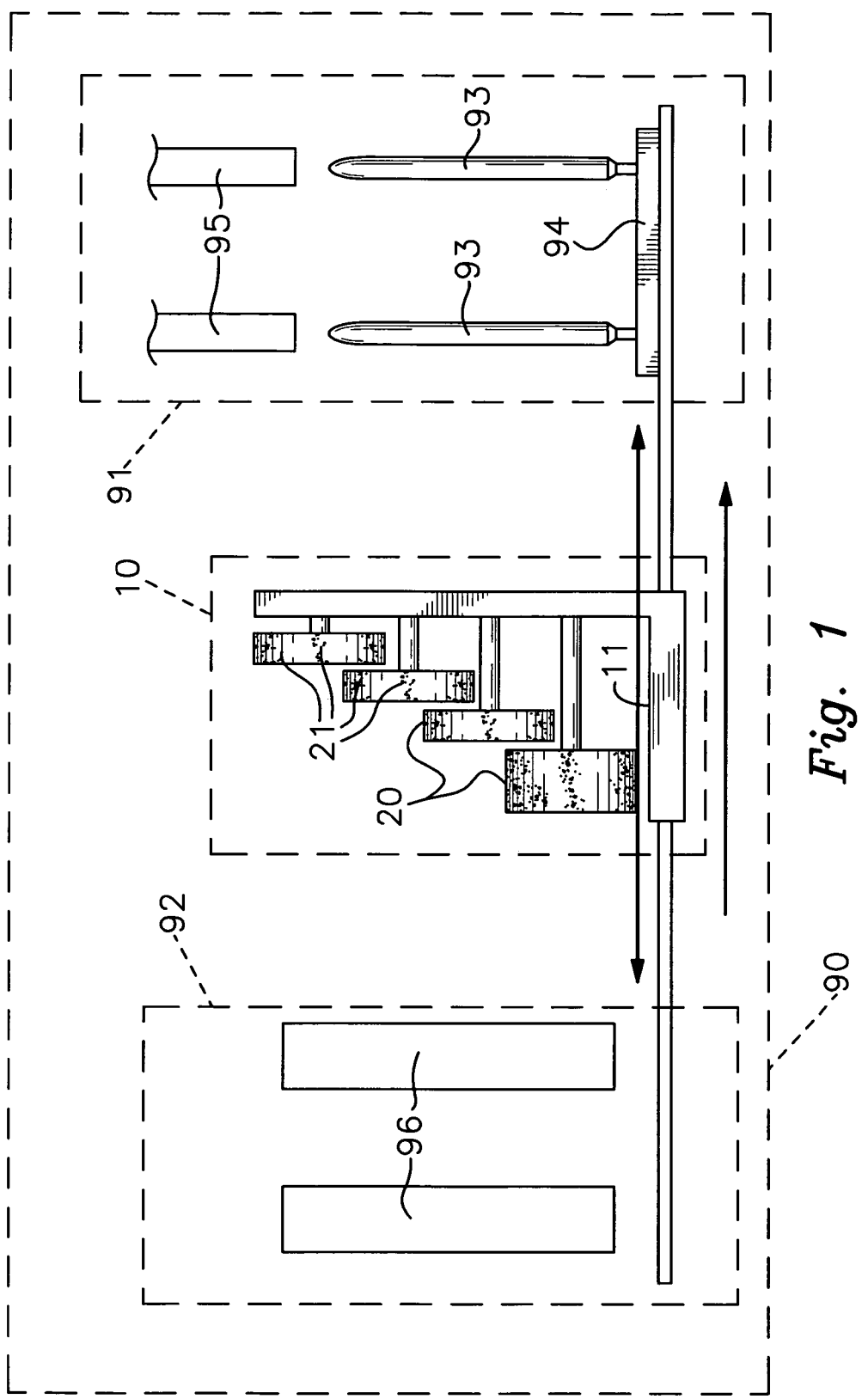
FIG. 1 is a generally schematic view of a representative condom testing apparatus having the failed roll condom removal apparatus incorporated therein.

A representative condom testing apparatus 90 is shown generally schematically in FIG. 1, and comprises a loading station 91 where condoms 30 to be tested are individually loaded onto mandrels 93. The loading means 95 for positioning the condoms 30 onto the mandrels 93 in the loading station 91 may be accomplished using any suitable loading technique and mechanism, various types being known in the industry. The mandrels 93 are mounted onto shuttle carriages 94 that in this embodiment reciprocate from the loading station to a testing and condom removal station 92 and back to the loading station 91, where the next batch of condoms 30 are loaded onto the now empty mandrels 93. The condom testing and removal means 96 may comprise any suitable testing and removal techniques and mechanisms, various types being known in the industry, and the mechanisms and operations of testing the condoms 30 may be separate and distinct from the mechanisms and operations of condom removal. While the invention is being described with regard to testing equipment that uses reciprocating means to bring the condoms 90 to the testing station 92, it is to be understood that the invention as described herein may also be utilized with uni-directional or closed loop systems of mandrel travel. In the testing and condom removal station 92, all of the condoms 30 are intended to be removed from the mandrels 93 prior to the return of the shuttle carriage 94 back to the condom loading station 91. In practice however, it often occurs that a condom 30, whether defective or non-defective, is not removed and inadvertently remains on one or more of the mandrels 93 as they are returned to the loading station 91.

The failed roll condom removal apparatus 10 is disposed as part of or in conjunction with the testing apparatus 90 at a location between the loading station 91 and the testing and removal station 92. Detection means 40, such as a circuit comprising a photodetector, is provided in the testing and removal station 92 or adjacent thereto for detection during the return to the loading station 91, such that in known manner the presence of any condom 30 that inadvertently remains on a mandrel 93 as the mandrels 93 are brought back to the loading station 91 is detected, thereupon causing initiation of the failed roll condom removal operation sequence. Programming in the detection means 40 causes a slowing of the return travel rate for the shuttle carriage 94 at the appropriate time, such that the particular mandrel 93 upon which the failed roll condom 30 resides is slowed as it passes the location of the failed roll condom removal apparatus 10. Simultaneously with the slowing the shuttle carriage 94, the failed roll condom removal apparatus 10 is advanced and brought into contact with the mandrel 93 and failed roll condom 30. A typical deceleration may be from a standard travel speed of 90 inches per second to a slowed speed of 15 inches per second, with the slower rate of travel occurring over about a 14 inch window. Most preferably, the travel speed is smoothly or gradually ramped down and then back up rather than abruptly changed, such that no jarring forces are directed against the shuttle carriage 94.

The failed roll condom removal apparatus 10 further comprises ejection means to remove or eject the failed roll condom 30 from the mandrel 93. The apparatus 10 as shown comprises a brush housing or carriage 11 that is advanced and retracted in reciprocating manner between an operative or active position and a recessed passive or non-operative position, such as by mounting the brush carriage 11 on tracks 12 and utilizing one or more air cylinders or the like to reciprocate the brush carriage 11 at a relatively show rate, such as about 10 inches per second, to reduce jarring. A motor 13 and system of belts 14 or similar system is provided to drive rotating circular brushes 20, whereby all the brushes 20 rotate in the same direction and such that the direction of rotation of the brushes 20 at the point of contact with the mandrel 93 is upward or toward the tip of the mandrel 93. A suitable size for the brushes 20 are approximately five inches in diameter, with the first brush 20 coming in contact with mandrel 93 being preferably wider than the remaining brushes 20 in order to insure that the lowermost portion of the failed roll condom 30, usually comprising the condom ring, is pushed upward over the bottom shoulder of the mandrel 93. For example, the first brush 20 may be two inches wide with the remaining brushes 20 being one inch wide. The bristles 21 on the brushes 20 are preferably relatively stiff, since it does not matter if the condom 30 is damaged during removal, and may comprise nylon members about 0.040 inches in diameter. The brushes preferably turn at about 400 to 500 revolutions per minute. Alternatively, it is contemplated that the brushes 20, which constitute rotating removal means in general, may consist of belts, bristle belts, angled and elongated roller brushes or similar means for removal of the condom 30 from the mandrel 93.

Figure 2:
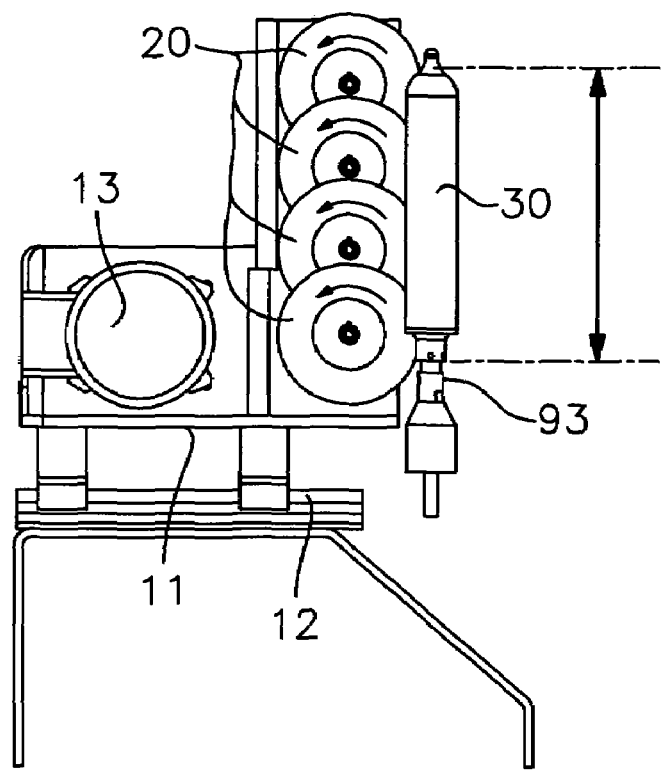
FIG. 2 is a side view of the failed roll condom removal apparatus, illustrating the ascending arrangement for the rotating brushes.
Figure 3:
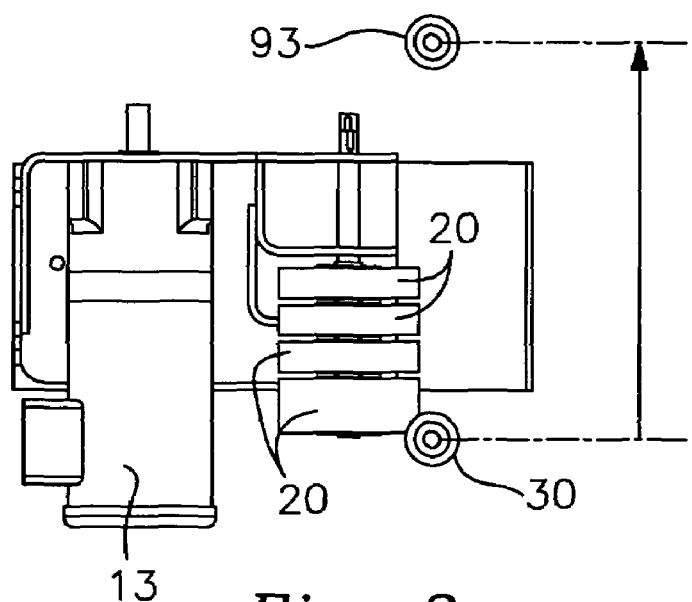
FIG. 3 is a top view of the failed roll condom removal apparatus.
Figure 4:
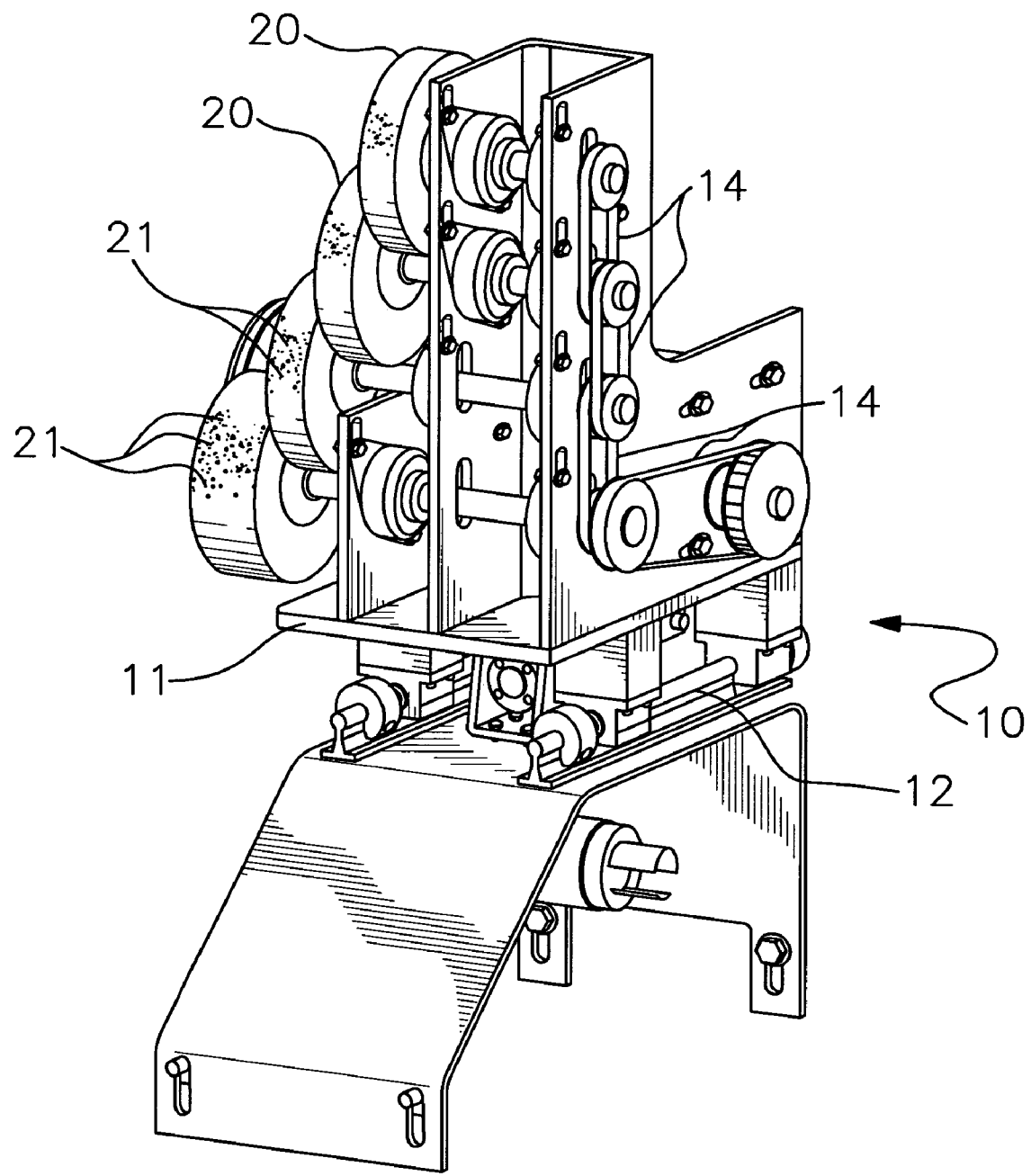
FIG. 4 is a perspective view of the failed roll condom removal apparatus.

As seen best in FIGS. 2 and 4, the brushes 20 are mounted in an ascending arrangement in the direction of mandrel travel during the return stroke for the shuttle carriage 94, such that the second brush in line is higher relative to the mandrel 93 than the first brush 20, the third brush 20 is higher than the second brush 20, etc. This may be accomplished as shown by mounting each ascending brush 20 just above the shaft of the adjacent lower brush 20. The brushes 20 are positioned close to each other laterally such that the area of mandrel contact between a brush 20 and an adjacent brush 20 overlaps, such that there is not position where the condom 30 will not be in contact with at least one brush 20 as the mandrel 93 progresses across the removal zone. In this manner the failed roll condom 30 will be continuously and successively pushed upward by the brushes 20 and finally ejected from the mandrel 93, the lowermost brush 20 contacting the lowermost portion of the mandrel 93 or the failed roll condom 30 first, the next higher brush 20 contacting the failed roll condom 30 and the mandrel 93 at a slightly higher location, etc. Preferably the bristles 21 have about one half inch of engagement with the mandrel 93 to insure that movement of the condom 30 is accomplished by each brush 20.

Figure 5:
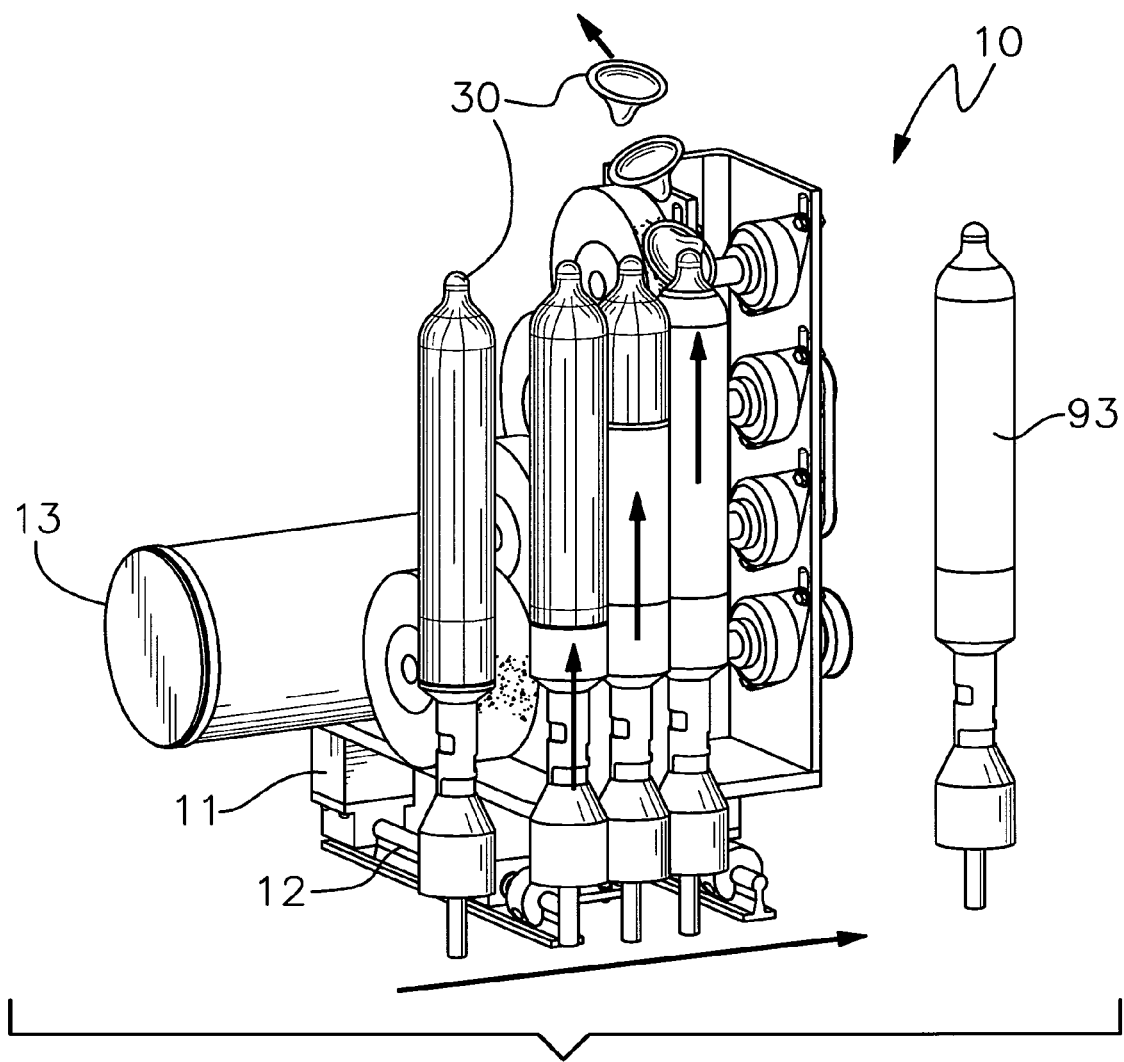
FIG. 5 is a view showing successive steps of a failed roll condom being ejected from a mandrel as the mandrel travels past the failed roll condom removal apparatus.

The failed condom removal operation is rather straightforward. When a failed roll condom 30 is detected on a mandrel 93 by the detection means 40, the return stroke of the mandrel shuttle carriage 94 is slowed, with the deceleration commencing only when the particular mandrel 93 containing the failed roll condom 30 approaches the removal zone. At the same time, the brush carriage 11 is advanced into the removal zone such that the first and lowermost brush 20 contacts the lowermost portion of the mandrel 93 and condom 30. As the mandrel 93 advances, as shown in FIG. 5, contact with successive, ascendingly-arranged circular rotating brushes 20 forces the condom 30 upward and finally ejects the condom 30 from the mandrel 93. The brush carriage 11 is then retracted and the shuttle carriage 94 is accelerated back to the normal operational speed. Normal loading and testing operations then continue until the next failed roll condom is detected.

It is contemplated that equivalents and substitutions for certain elements and structures set forth above may be obvious those skilled in the art, and therefore the true scope and definition of the invention is to be as set forth in the following claims.

I claim:

1. A condom loading, testing and handling apparatus comprising mandrels, a loading station and a testing station, wherein
   condoms are placed onto mandrels in a loading station,
   said mandrels travel to a testing station and
   said condoms are then removed from said mandrels after testing, and
   wherein some of said condoms are failed roll condoms that are not properly removed from said mandrels after testing;
   said apparatus further comprising a failed roll condom removal apparatus comprising
   detection means for detecting the presence of a failed roll condom on one of said mandrels and
   failed roll condom removal means, comprising a series of brushes for removing said failed roll condom from said mandrel.

2. The apparatus of claim 1, wherein said brushes are rotating brushes.

3. The apparatus of claim 2, wherein said brushes are located side by side such that all said brushes rotate in the same direction.

4. The apparatus of claim 3, wherein said brushes are disposed in an ascending arrangement relative to the direction of travel of said mandrel during the failed roll condom removal operation.

5. The apparatus of claim 4, wherein said brushes are arranged such that said mandrel is in contacted with at least one of said brushes during the entire removal operation.

6. The apparatus of claim 1, further comprising means to transport said mandrels across said brushes during the removal operation, wherein said failed condom is removed from said mandrel without stopping transport of said mandrels.

7. The apparatus of claim 1, wherein said detection means comprises a photoelectric detector.

8. The apparatus of claim 1, wherein said failed roll condom removal apparatus further comprises means to reciprocate said failed roll condom removal apparatus between an operative position with said brushes in contact with said failed roll condom and a non-operative position.

9. A failed roll condom removal apparatus removing a failed roll condom from a mandrel, said apparatus comprising;

detection means to detect the presence of a failed roll condom on a mandrel;
   a plurality of rotating brushes arranged in ascending order such that the lowermost brush contacts the lowermost portion of said mandrel and said failed roll condom first to push said failed roll condom up said mandrel, with each brush in order thereafter contacting said failed roll condom at a higher location than that of a previous brush, such that said failed condom is ejected from said mandrel;
   means to reciprocate said brushes between an operative position in contact with said mandrel and said failed roll condom and a non-operative operative position.

10. The apparatus of claim 9, wherein all said brushes rotate in the same direction.

11. The apparatus of claim 9, wherein said brushes are arranged such that said mandrel is in contacted with at least one of said brushes during the entire removal operation.

12. The apparatus of claim 9, wherein said detection means comprises a photoelectric detector.

13. A condom loading, testing and handling apparatus comprising a mandrel receiving a condom thereon for testing purposes, a loading station positioning said condom onto said mandrel, means to transport said mandrel and condom to a testing and removal station and means to transport said mandrel back to said loading station after said condom has been tested; and
   further comprising a condom removal apparatus distinct from said testing and removal station, whereby in the event said condom is not properly removed from mandrel by said testing and removal station, said condom removal apparatus removes said condom prior to the return of said mandrel to said loading station;
   said condom removal apparatus comprising:
   means to detect the presence of said condom on said mandrel during return of said mandrel to said loading station; and
   a plurality of rotating brushes arranged laterally so as to successively contact said condom and said mandrel during said return.

14. The apparatus of claim 13, said brushes of said condom removal apparatus are arranged in ascending manner relative to said mandrel and to the direction of travel of said mandrel during said return.

15. The apparatus of claim 14, said condom removal apparatus further comprising means to reciprocate said brushes from an operative position in contact with said mandrel to an inoperative position.

16. The apparatus of claim 15, said condom removal apparatus further comprising a brush carriage upon which said brushes are mounted, said brush carrier being mounted on tracks such that said brush carriage is reciprocated along with said brushes.

17. The apparatus of claim 13, wherein said detection means comprises a photoelectric detector.

18. The apparatus of claim 13, wherein said brushes are circular brushes rotating in the same direction.

* * * * *